United States Patent
Hirath et al.

(10) Patent No.: US 6,257,684 B1
(45) Date of Patent: Jul. 10, 2001

(54) HEAT INSULATION WALL

(75) Inventors: Jürgen Hirath, Heidenheim; Markus Schütte, Nürnberg, both of (DE)

(73) Assignee: BSH Bosch und Siemens Haus-geraete GmbH, Munich (DE)

(*) Notice: Subject to any disclaimer, the term of this patent is extended or adjusted under 35 U.S.C. 154(b) by 0 days.

(21) Appl. No.: 09/174,038

(22) Filed: Oct. 16, 1998

(30) Foreign Application Priority Data

Oct. 16, 1997 (DE) .............................................. 197 45 862

(51) Int. Cl.⁷ .................................................. A47B 96/04
(52) U.S. Cl. ........................... 312/406.1; 428/69; 62/465; 220/592.27; 52/588.1
(58) Field of Search ..................... 312/400, 406, 312/406.1, 409; 428/69, 75, 76; 62/45.1, DIG. 13, 907, 440, 465; 220/592.27, 560.12, 560.1; 445/70, 73; 215/13.1; 105/357; 52/788.1

(56) References Cited

U.S. PATENT DOCUMENTS

| | | |
|---|---|---|
| 1,898,977 | 2/1933 | Comstock . |
| 2,434,177 * | 1/1948 | Money et al. .................. 220/592.27 |
| 2,518,673 | 8/1950 | Ellsworth . |
| 2,989,156 * | 6/1961 | Brooks et al. ....................... 52/788.1 |
| 3,156,975 | 11/1964 | Shaw . |
| 3,161,265 * | 12/1964 | Matsch et al. ....................... 52/788.1 |
| 3,383,044 * | 5/1968 | Closner ........................... 220/560.12 |
| 5,634,256 | 6/1997 | Fritschi . |

FOREIGN PATENT DOCUMENTS 195 20 020
A1  12/1998 (DE) .

* cited by examiner

Primary Examiner—Peter M. Cuomo
Assistant Examiner—Jerry A. Anderson
(74) Attorney, Agent, or Firm—Herbert L. Lerner; Laurence A. Greenberg; Werner H. Stemer

(57) ABSTRACT

A heat insulation wall has two outer surface layers disposed at a distance from one another; the outer surface layers have a contour and are at least substantially vacuum-tight. The heat insulation wall has a connecting profile which extends along the contour, connects the two outer surface layers in a vacuum-tight fashion, and encloses, together with the two outer surface layers, an evacuable space. The connecting profile is composed of a plurality of profile sections. An evacuable thermal insulation material is filled in the evacuable space. A support element is fastened to the outer surface layers and serves as a bearing for the profile sections. The profile sections are supported on the support element and are connected to the support element in a vacuum-tight fashion.

12 Claims, 5 Drawing Sheets

HEAT INSULATION WALL

BACKGROUND OF THE INVENTION

Field of the Invention

The invention relates to a heat insulation wall. The heat insulation wall has two outer, at least essentially vacuum-tight surface layers. These surface layers are disposed at a distance from one another and are connected to one another in vacuum-tight fashion by means of a connecting profile, which extends along their contour. The connecting profile has an essentially U-shaped design in cross section and is composed of a plurality of profile sections. The surface layers together with the connecting profile enclose an evacuable space. The evacuable space is filled with an evacuable thermal insulation material.

The outer wall shells of heat insulation walls based on vacuum insulation technology are generally formed from stainless or corrosion-protected steel plate and are spaced apart from one another. The outer wall shells are connected to one another by a connecting profile, which is fastened in vacuum-tight fashion by welding to both wall shells. In the majority of cases, the connecting profile is subdivided into individual lengthwise sections, in order to make production cost-effective and, moreover, to enable the production tolerances and form tolerances to be compensated at its joining site between the two outer shell walls. However, this type of construction and assembly of a connecting profile requires connecting the individual sections to one another in vacuum-tight fashion. The point of connection in these connecting profiles has been designed both as a butt joint and as a lap joint, the joining sites being connected to one another by welding. In order to be able to introduce or transfer tension forces onto the connecting profiles required for their proper welding and, at the same time, to avoid heat-induced distortion between the parts being connected during the welding operation (such distortion is a possible cause of leaks), the thickness of the material from which the connecting profiles are made has been chosen to be in the same order of magnitude as that of the shell walls.

SUMMARY OF THE INVENTION

It is accordingly an object of the invention to provide a heat insulation wall which overcomes the above-mentioned disadvantages of the heretofore-known heat insulation walls of this general type and which requires only simple constructional measures to avoid the prior art disadvantages affecting a heat insulation wall.

This object is achieved in accordance with the invention by supporting the profile sections of the connecting profile at their joining sites by means of a support element which is fastened to the surface layers. The support element acts as a bearing for the profile sections and is connected to the profile sections in vacuum-tight fashion.

With the foregoing and other objects in view there is provided, in accordance with the invention, a heat insulation wall, comprising two mutually spaced apart outer surface layers having a contour, and being at least substantially vacuum-tight; a connecting profile extending along the contour, connecting the two outer surface layers in a vacuum-tight fashion, and enclosing, together with the two outer surface layers, an evacuable space, the connecting profile composed of a plurality of profile sections; a thermal insulation material filled in the evacuable space; and a support element fastened to the outer surface layers and supporting the profile sections, the profile sections being vacuum-tightly connected to the support element.

In accordance with another feature of the invention, each of the profile sections has a joining site, and the support element supports the profile sections at the joining sites.

In accordance with a further feature of the invention, the connecting profile is at least substantially U-shaped and has a sheet-shaped, thin-walled base bearing against the support element.

In accordance with another feature of the invention, the profile sections have facing ends, the support element has a U-shaped profile and has a base supporting the facing ends of the profile sections.

In accordance with yet another feature of the invention, the support element has a U-shaped profile, a base, and end faces fastened to the outer surface layers.

In accordance with yet a further feature of the invention, the support element has legs and tabs provided at the end faces adjacent to the legs, the tabs project in a direction from the base to the legs and are fastened to the outer surface layers.

In accordance with another feature of the invention, the support element is cup-shaped and has at least two cup walls, the cup walls are at least approximately parallel and opposite to one another and fastened to the outer surface layers.

In accordance with yet another feature of the invention, a cover element covers the profile sections at the joining sites in a region of the support element, the cover element being connected to the support element in a vacuum-tight fashion.

In accordance with another feature of the invention, a cover element covers one of the profile sections at an end thereof, the end forming a joining site in a region of the support element, the cover element being connected to the support element in a vacuum-tight fashion.

In accordance with a further feature of the invention, a cover element has a flat profile, covering at least substantially a joining site in a region of the base of the connecting profile, and is connected in a vacuum-tight fashion to the support element at free ends of the profile sections.

In accordance with yet a further feature of the invention, the cover element has a U-shaped profile, a base, and legs and is connected in vacuum-tight fashion to the profile sections and the support element, the base together with the legs cover at least substantially a site of join between the profile sections.

In accordance with another feature of the invention, the profile sections have legs and a tongue-and-groove connection for joining the profile sections at least at the legs.

In accordance with yet another feature of the invention, a refrigeration device, comprises a heat insulation housing and a heat insulation door, the housing and the door including a heat insulation wall in accordance with the appended claims.

In accordance with a further feature of the invention, a domestic stove, comprises a heat insulating stove muffle surrounding an oven space, the stove muffle including a heat insulation wall in accordance with the appended claims.

The introduction of support elements between the surface layers provides not only an assembly aid, in the form of a bearing, for the individual lengthwise sections of the connecting profile at their joint site (joining site) but also a supporting measure which is able to accommodate the profile-section ends that are to be connected to one another in vacuum-tight fashion, against the tensions which are necessary in the course of the welding operation in order to avoid instances of distortion, in the direction of the space filled with thermal insulation material.

The bearing also ensures that the profile sections, which require a vacuum-tight fastening with respect to the surface layers, are disposed substantially at the same height. Thus facilitating not only a vacuum-tight fastening along the legs of the profile sections by means of welding, for example, but also facilitating the vacuum-tight connection of the profile-section ends to the bearing likewise by means of welding, for example. Moreover, the introduction of the bearings allows the base of the profile sections to be designed with particularly thin walls, in the manner of a foil. Thin walls may be used because the base is no longer required to absorb tensions which occur in the course of the insertion and subsequent vacuum-tight welding of the profile sections to the surface layers. The foil-like or sheet-like design of the profile-section base significantly reduces its thermal conduction. This allows filling the space with inexpensive thermal insulation materials, such as open-cell polyurethane foam or open-cell polystyrene foam, for example, without any notable reduction in the heat insulation properties. In addition, the bearings designed as a support element allow a rapid and accurately positioned insertion or introduction of the profile sections between the outer surface layers. This obviates additional alignment measures, which would otherwise be necessary for the vacuum-tight connection of the profile sections to the surface layers. Thus a cost-effective manufacture of the heat insulation wall is achieved.

In terms of markedly reduced thermal conduction, a connecting profile of U-shaped cross section is particularly favourable, if in accordance with a preferred embodiment, the connecting profile has a base which bears against the support element and is furnished with a sheet-like, thin-walled wall thickness.

According to another preferred embodiment, the support element is designed as a U-shaped profile whose base serves to support the profile sections which bear with their base against the support elements at the site of join. This provides a support element, which, by its very design, already has an inherent rigidity. The legs of the support element with the U-shaped profile already provide a certain aid for joining when it is introduced between the surface layers. Likewise, a support element designed in this way offers a flat bearing surface, which considerably facilitates the assembly process of the profile sections.

In accordance with an advantageous embodiment of the subject matter of the invention, the end faces of the support element designed as a U-shaped profile are fastened to the surface layers.

This kind of placement or introduction of the support element between the surface layers greatly increases the load-bearing properties of the layers for supporting the tensions which occur during assembly of the individual profile sections. The arrangement of the legs substantially increases the resistance of the support elements against flexure. In addition, the thermal conduction brought about by the support element between the surface layers is minimised.

In another preferred embodiment of the subject matter of the invention, the support element designed as a U-shaped profile is provided adjacent to its legs, on its end faces, with tabs which project with respect to the base on the leg side and which are fastened to the surface layers.

By attaching the tabs to the end faces of the support elements it is possible to attach or fix them quickly and easily to the surface layers by means of welding, for example. This is possible, because the welding operation need not take place at the very narrow confines of the end faces of the U-shaped profile but instead can take place at the tabs, which have a markedly larger surface area. This also provides great reliability of the vacuum-tight welding of the support elements to the surface layers.

In another preferred embodiment, the support element is designed as a cup having at least two walls which are at least approximately parallel and opposite to one another and by means of which it is fastened to the surface layers.

Support elements of this kind can be produced particularly cost-effectively in large numbers by means, for example, of the deep-drawing of thin-walled stainless steel sheet having various geometries and support properties.

In a further preferred embodiment of the invention, the profile sections are covered at the site of join, in the region of the support element, by a cover element, which is connected to the support element in vacuum-tight fashion.

The vacuum-tight covering of the ends of the profile sections at their sites of join, in the region of the support element, is particularly secure if, according to an alternative embodiment, the profile sections are each covered at their ends, which form the site of join, in the region of the support element by a cover element covering the end of a profile section and being connected to the support element in vacuum-tight fashion.

The covering of the joint site of two profile sections by a cover element enables the free profile-section ends laid down on the support element to be fastened to the support elements in vacuum-tight fashion by welding in a particularly reliable and rapid process, especially when the cover section has at least approximately the same thickness of material as the surface layers and/or as the bearing section.

A cover section is particularly simple and inexpensive to produce if, in accordance with a further advantageous embodiment, the cover element or elements is or are designed as a flat profile or profiles which at least substantially covers or cover the site of join in the region of the base of the profile sections of U-shaped cross-sectional design and is or are fastened in vacuum-tight fashion by welding to the free ends of the profile sections.

In addition, a cover section which is designed as a flat profile can be positioned particularly easily and quickly in the manufacturing sequence at the joint site between the individual profile sections, wherein the joint site is to be vacuum-tight.

According to an alternative embodiment of the invention, the cover element or elements is or are designed as a U-shaped profile or as U-shaped profiles whose base or bases together with its or their legs covers or cover at least substantially the site of join between the profile sections and is or are connected in vacuum-tight fashion to the profile sections.

This achieves in a particularly simple and reliable manner a vacuum-tight welding of the facing ends of the profile sections, including their leg region, to the surface layers, since the weld seam course is able to extend continuously via the legs of the cover section into the legs of the profile sections.

According to another preferred embodiment of the invention, the profile sections can be joined, at least at their legs, in the manner of a tongue-and-groove connection.

Designing the profile-section legs in this manner permits a continuous and process-reliable weld seam course running along the legs of the profile sections and over their joint site in the region of the support elements. This can be achieved because the tongue-and-groove connection is able to compensate in a gap-free manner for length tolerances occurring at the assembly stage. In addition, the tongue-and-groove construction on the legs of the profile sections, in combination with the cover elements of U-shaped design which have at least approximately the same thickness of material as the surface layers, permits a particularly robust, vacuumtight welding of the joint site. The welding can moreover be carried out at a high welding speed. Furthermore, the possibility of joining the individual profile sections by means of the tongue-and-groove connection greatly facilitates the preassembly of the individual profile sections between the surface layers. This is possible because, prior to the welding operation, the sections can be brought into their correct assembly position in the form of a quasi-continuous train of profiles. Furthermore, the possibility of joining the profile sections results in a marked reduction not only in the use of tensioning tools but also in the frequency of tightening or tensioning necessary for a faultless fixing to the surface layers.

A heat insulation housing and a heat insulation door for a refrigeration device can be produced with particularly durable vacuum-tightness, low intrinsic weight and low thermal conduction if, in accordance with a preferred embodiment of the invention, the housing and the door are designed in accordance with the appended claims.

A heat insulation stove muffle enclosing an oven space of a domestic stove can likewise be produced with particularly durable vacuum-tightness and with particularly low intrinsic weight if, in accordance with a further preferred embodiment of the invention, the muffle is designed in accordance with the appended claims.

Other features which are considered as characteristic for the invention are set forth in the appended claims.

Although the invention is illustrated and described herein as embodied in a heat insulation wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
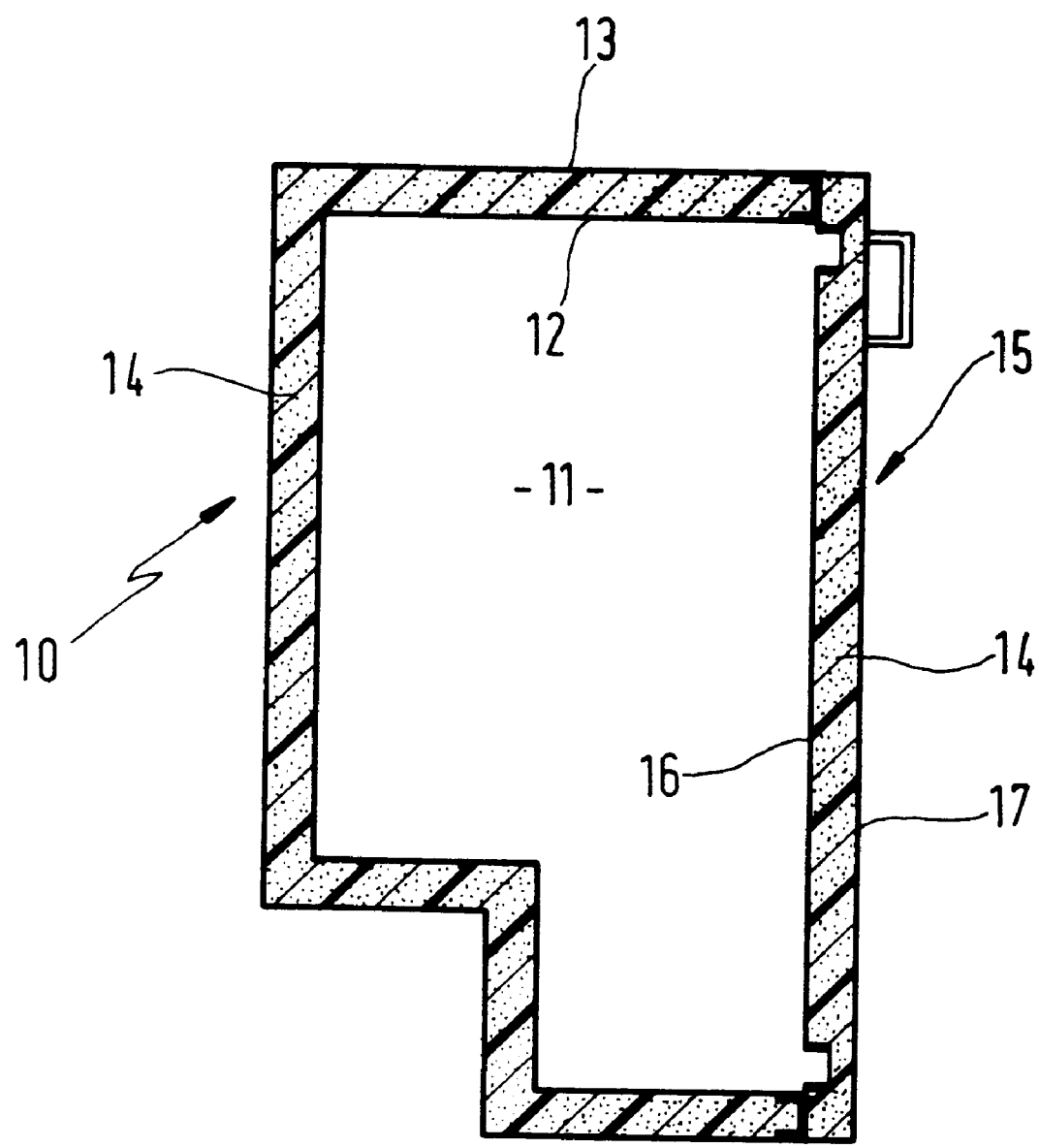
FIG. 1 is a simplified diagrammatic cross-sectional view illustrating a heat insulation housing of a domestic refrigerator, having two surface layers which are disposed at a distance from one another and which, at the free edges, are welded to a connecting profile in vacuum-tight fashion.

Referring now to the figures of the drawings in detail and first, particularly, to FIG. 1 thereof, there is shown a heat insulation housing 10 which is suitable for use for a domestic refrigerator and whose useful space 11, designed as a cool box, is lined with an internal lining surface layer 12. The internal lining surface layer 12 is formed, for example, from a plate of stainless or corrosion-protected steel sheet having a sheet thickness of 0.4 mm or else from a metal-coated or laminated plastic plate. At a distance from the surface layer 12, the housing 10 has a further surface layer 13 which serves as an outer lining and which is formed from the same material as the surface layer 12. A support material in the form of open-cell thermal insulation material is introduced between the surface layers 12 and 13. The thermal insulation material may for example be slab-shaped polyurethane or polystyrene foam. Thermal insulation material 14 of this kind is also employed for a door 15 attached at and bounding against the opening edge of the housing 10 and serves to support an internal surface layer 16 against an external surface layer 17. Both surface layers 16 and 17, are made from the same material as the surface layers 12 and 13. Both, the surface layers 16 and 17 and the surface layers 12 and 13 are respectively connected to one another at their free edges in vacuum-tight fashion by a connecting profile which is explained in more detail below.

Figure 2:
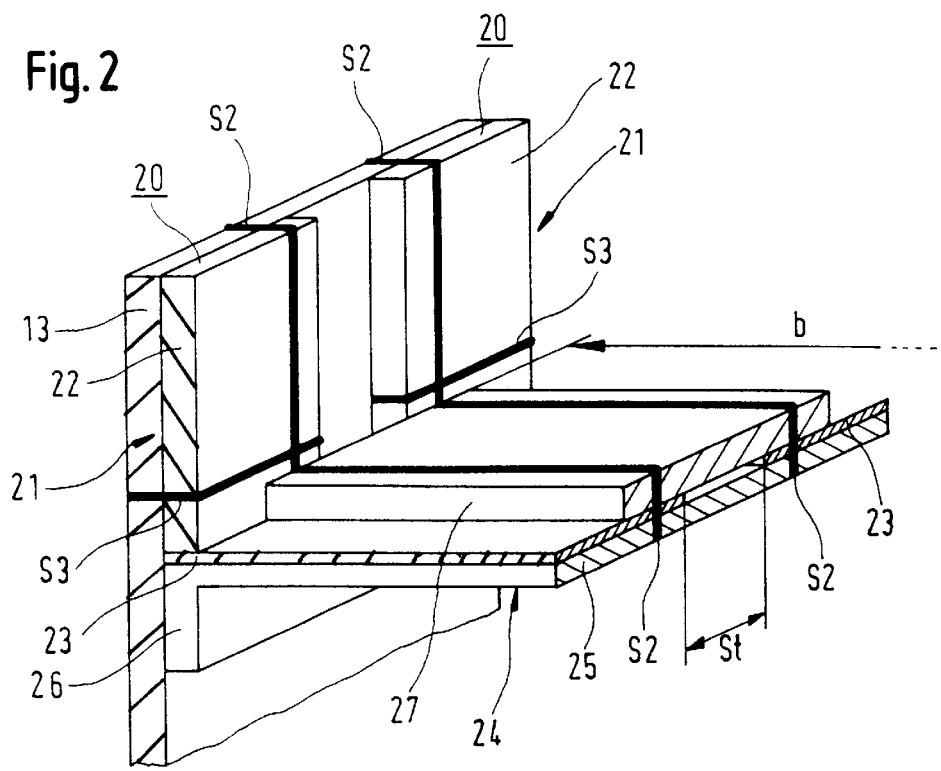
FIG. 2 is a three-dimensional frontal view of one of the surface layers with—disposed thereon—the connecting profile, composed of a plurality of profile sections which are welded in vacuum-tight fashion at their joint sites, both to one another and to the surface layers, in accordance with a first connection variant.
Figure 3:
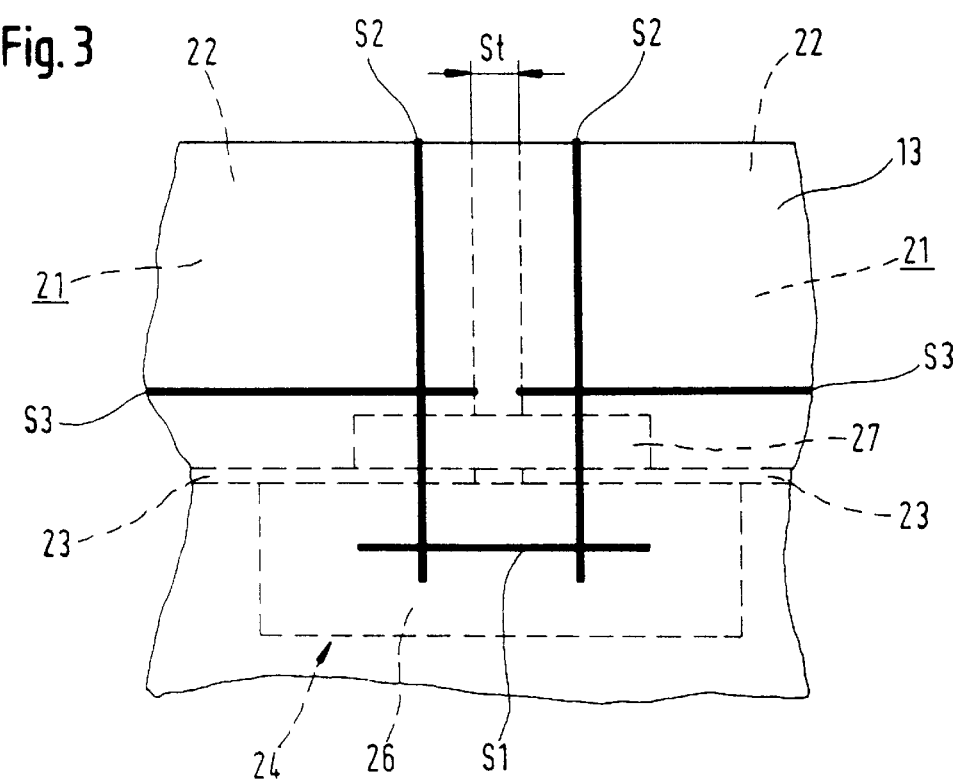
FIG. 3 is a side view of the surface layer and the connecting profile with its profile sections of FIG. 2, connected by welding.

A first embodiment of a connecting profile 20 which is shown in FIG. 2 and explained on the basis of the example of the housing 10, is subdivided lengthwise into a plurality of profile sections 21. FIG. 2 shows two of those profile sections 21 arranged with their end sections at a distance from one another. The profile sections 21 are designed with a cross section in the form of a U-profile whose legs 22 are produced for example from stainless or corrosion-protected steel sheet. These stainless or corrosion-protected steel sheets have approximately the same thickness of material as the surface layers 12 and 13. The base 23, which connects legs 22 to one another, is formed from sheet-like stainless steel or steel sheet. The thickness of the sheet of the base 23 is, for example, 0.1 mm and thus much smaller than the thickness of the material of the legs 22. The base 23 of the profile sections 21 bears against a support element 24, which is designed with a U-shaped cross section. The outer face of the base 25 of the element 24 serves as a bearing surface for the profile sections 21. The legs 26 (only one of which is shown) of the element 24 are fastened to the insides of the surface layers 12 and 13 by means of a weld seam S1 (see FIG. 3). On the side opposite to the base 25, the end sections, which form a joint site or abutting site St, are covered in the region of the base 23 by a flat-profiled cover element 27. The cover element 27 is made from stainless steel sheet. The cover element covers the free ends of the base 23 and has a breadth b, which makes up at least approximately the internal width between the legs 22. Two weld seams S2 are provided for attaching the cover element 27. These weld seams S2 are disposed approximately at a parallel distance from one another and are produced, for example, by a beam or jet welding technique. The weld seams S2 pass through or penetrate the layered structure formed by the cover element 27, the end sections of the base 23 and the base 25. The weld seams S2 extend over the height of the legs 22 right up to their free end, and connect the legs 22 to the surface layers 12 and 13 by means of through-welding. In addition, the legs 22 are connected to the surface layers 12 and 13 in vacuum-tight fashion by a weld seam S3 which extends horizontally in the lengthwise direction of the legs 22 and intersects with the vertical section of the weld seam S2. The section extends over the height of the legs 22 and the seam S2 intersects in turn with the weld seam S1 on the legs 26 of the support element 24. The arrangement of the weld seams S1 to S3 achieves a vacuum-tight bond between the profile sections 21 themselves and between these sections and the surface layers 12 and 13, by welding at the joint site between the two profile sections. The weld seam S3 ensures the vacuum-tight bond between the surface layers 12 and 13 and the legs 22, along the latter.

Figure 4:
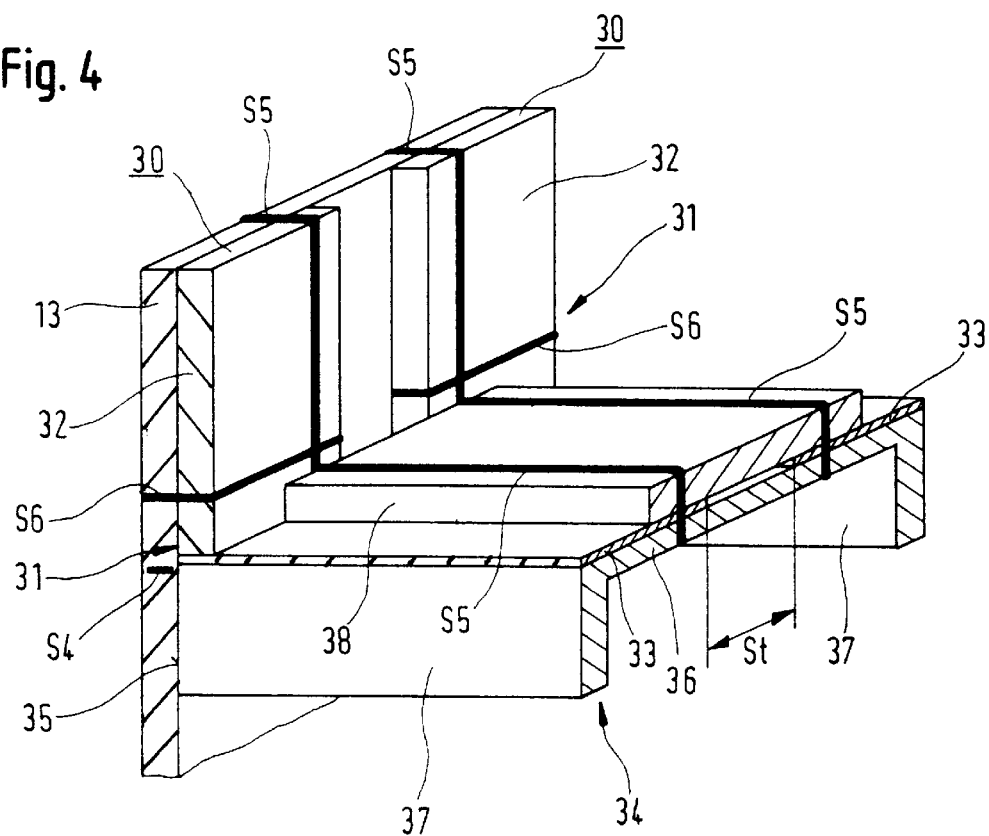
FIG. 4 is a three-dimensional cross-sectional frontal view of a design similar to the design of FIG. 2, with a welded connection of the joint sites of the profile sections, which in contrast to FIG. 2, are supported by a support element designed as a U-shaped profile whose leg runs parallel to the joint site.
Figure 5:
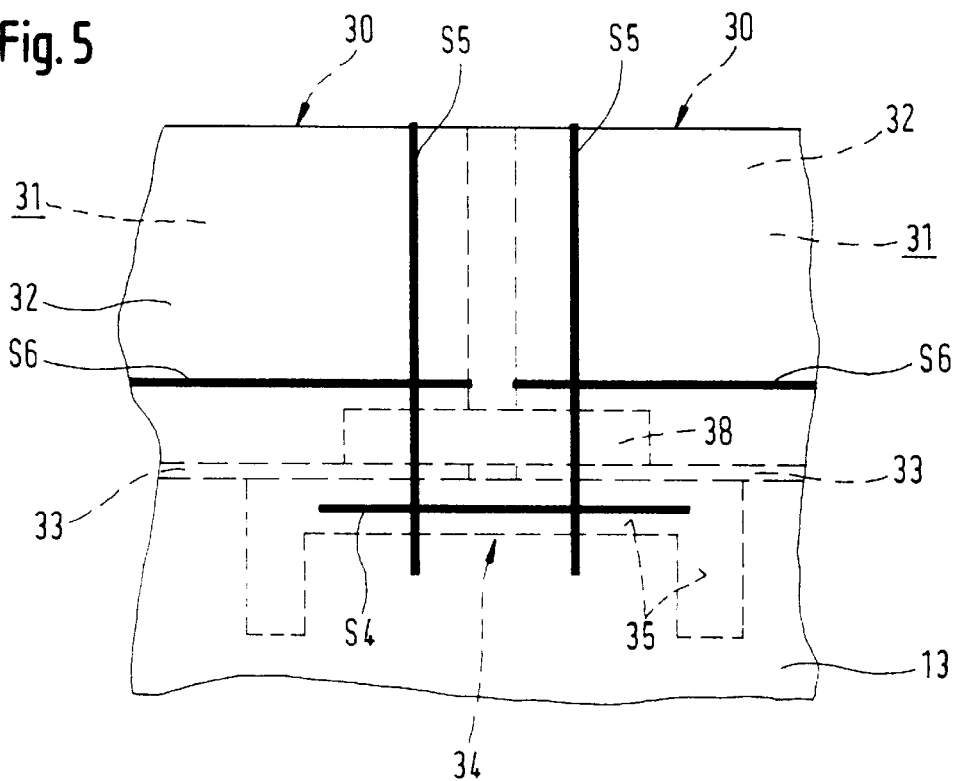
FIG. 5 is a side view of the surface layer and the connecting profile with its profile sections as in FIG. 4, connected by welding.

FIGS. 4 and 5 show a connecting profile 30 which is described on the basis of the example of the housing 10. The connecting profile 30, disposed between the surface layers 12 and 13, is designed in analogy to the connecting profile 20. It is therefore composed, like that profile, of a plurality of longitudinal profile sections 31 whose cross-sectional design is like that of a U-shaped profile and whose legs 32 have essentially the same thickness of material as the surface layers 12 and 13 and whose base 33 connecting the legs is supported by its outer face on a support element 34 whose cross-sectional design is U-shaped, the support element 34 being fixed by its end faces 35 by means in each case of a weld seam S4 arranged horizontally in the end-face region of the base 36 and being used, by its base connecting its two legs 37, as a bearing for the free ends of the profile section 31. The free ends of the profile sections 31, which are disposed at a distance from one another and form a joint site St, are covered in the region of their base 33 by a flat-profiled cover element 38. The cover element 38 covers the free ends, is made from stainless or corrosion-protected steel sheet and has at least approximately the same thickness of material as the surface layers 12 and 13 or the support element 34. The layered structure brought about by the cover element 38 at the joint site St between the profile sections 31 is held together by means of two weld seams S5. The weld seams S5, disposed at a distance from one another and extending at least approximately parallel to the longer side edges of the cover element 38, are produced, for example, by means of a beam welding technique. The weld seams S5 extend continuously in one path over the height of the legs 32, bond the legs 32 to the surface layers 12 and 13 in vacuum-tight fashion, and intersect with the weld seams S4. The weld seams S5 cross weld seams S6 which extend along the legs 32, are disposed in the vicinity of the base 33 and connect the legs 32 lengthwise to the surface layers 12 and 13 in vacuum-tight fashion. The vacuum-tight bond of the profile sections 31 at their joint site St is brought about by the arrangement of the weld seams S4 to S6 together with their intersections with one another. At the same time, thermal conduction via the profile sections is also substantially reduced.

Figure 6:
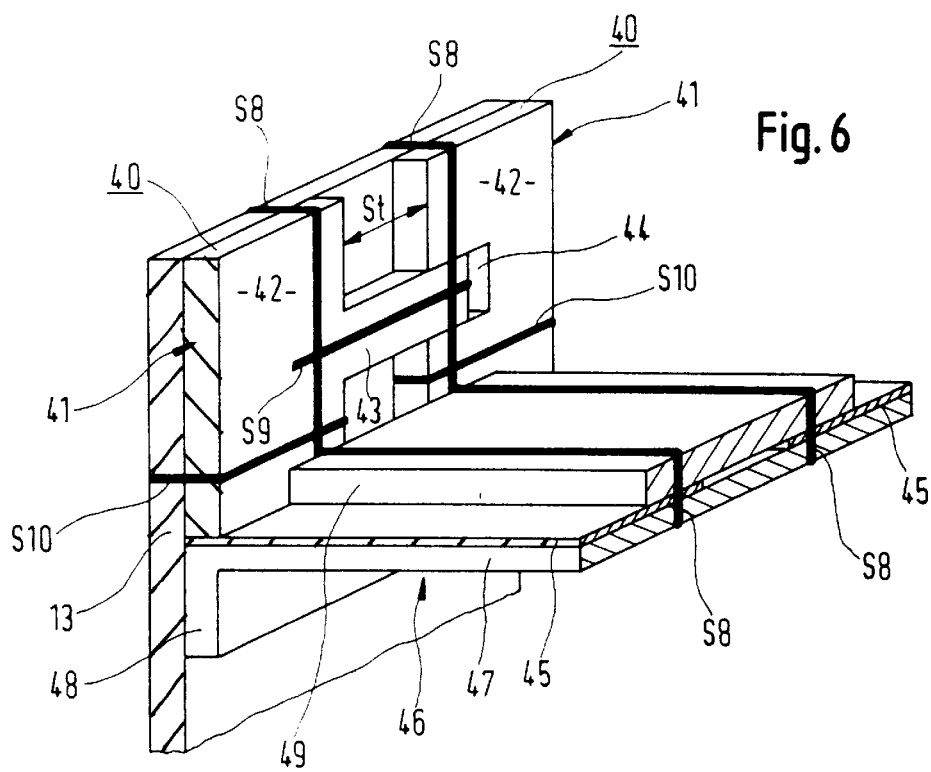
FIG. 6 is a three-dimensional cross-sectional frontal view of an embodiment which is an alternative to FIG. 2 and FIG. 4 for the design of the vacuum-tight welded connection of the profile sections at the joint site to one another and to the surface layers.
Figure 7:
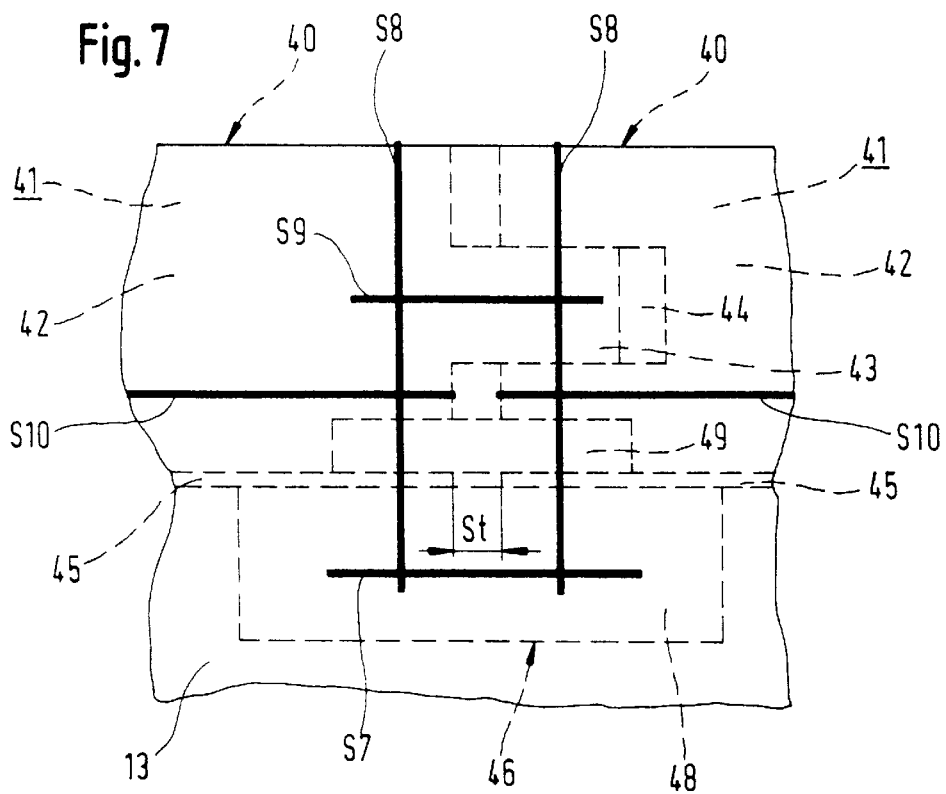
FIG. 7 is a side view of the surface layers and the connecting profile with its profile sections as in FIG. 6, connected by welding.

FIGS. 6 and 7 illustrate an alternative embodiment of a connecting profile 40, which is described on the basis of the example of the housing 10. The connecting profile 40 is fastened between the surface layers 12 and 13 and is subdivided lengthwise, like the connecting profiles 20 and 30, into profile sections 41 whose cross-sectional design is in the form of a U-shaped profile and whose legs 42, which have at least approximately the same wall thickness as the surface layers 12 and 13, can be connected at their facing end by means of a tongue-and-groove connection, in order to stiffen the free ends. One of the legs 42 carries a pinlike projection 43 which acts as the tongue. The other leg 42 is provided with a recess 44 which serves as the groove into which the projection 43 can be inserted for additional stiffening of the profile sections at their joint site St. The legs 42 of the profile sections 41 are connected to one another by means of a base 45. The base 45, having a thickness of a sheet or a foil, rests with its bottom side, which faces away from the free leg ends, on a support element 46 whose cross-sectional design is that of a U-shaped profile and whose base 47 in this case acts as a bearing. The legs 48 of element 46 (only one leg 48 is shown) extending in the lengthwise direction of the legs 42 are provided for fastening the support element to the surface layers 12 and 13, the fastening of the legs 48 being brought about by a weld seam S7. Opposite the base 47, the free ends of the profile sections 41 and the joint site St situated between them are covered by a cover element 49 whose cross-sectional design is that of a flat profile, the element 49 being produced, for example, from stainless steel or corrosion-protected steel sheet. The cover element 49 has essentially the same thickness of the sheet material as the legs 42 and is connected to the base 47 of the support element 46 by means of two weld seams S8. The weld seams S8 pass through the sandwich-like structure formed by the cover element 49, the base 45 and the base 47. In this arrangement, the weld seams S8 extend approximately parallel to the free end of the base 45 and continue uninterrupted over the legs 42, where they are crossed in the region of the projection 43 by a weld seam S9 and in the region of the legs 48 by the weld seam S7 and connect the legs 42 to the surface layers 12 and 13 (only one is shown) in vacuum-tight fashion by through-welding to one another. These surface layers are connected in vacuum-tight fashion to the legs 42 by means of weld seams S10 which intersect with the weld seams S8 at the free end of the legs 42 and which are disposed along the legs 42 in the vicinity of the base 45 of the profile sections 41. The latter are connected in vacuum-tight fashion at their facing ends, forming the joint site St, by the weld seams S8 to S10 and their interaction. This assembly minimises thermal conduction between the surface layers 12 and 13.

Figure 8:
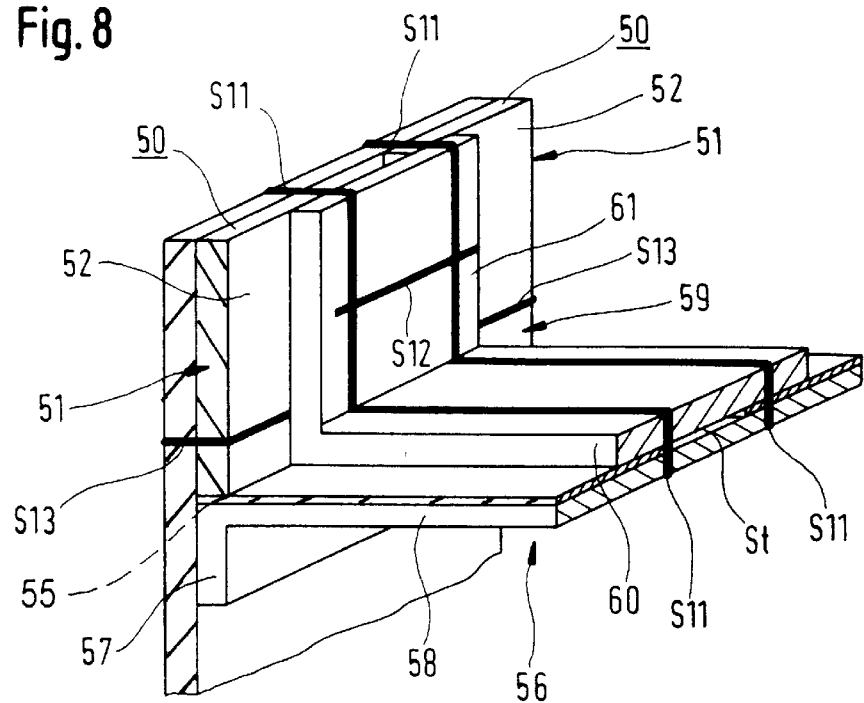
FIG. 8 is a three-dimensional cross-sectional frontal view of welded connection similar to FIG. 6, which in contrast to FIG. 6, is covered by a cover element of U-shaped design.
Figure 9:
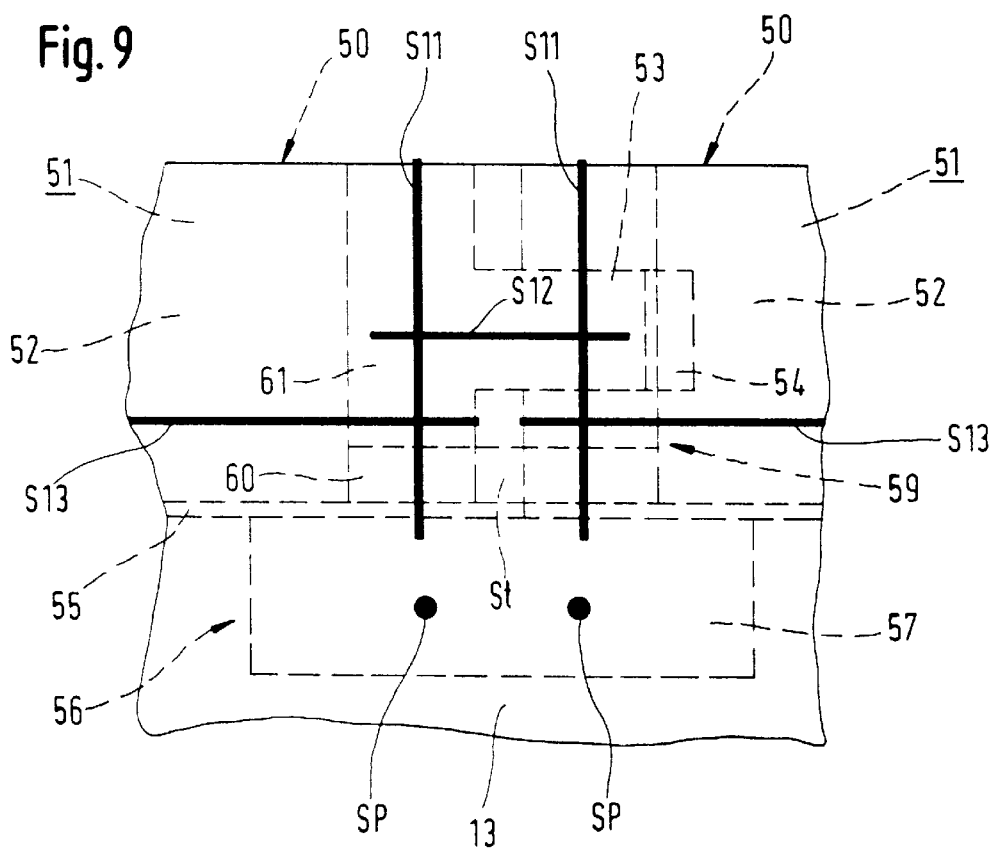
FIG. 9 is a side view of the surface layer and the connecting profile with its profile sections as in FIG. 8, connected by welding.

FIGS. 8 and 9 show a connecting profile 50 which is disposed between the surface layers 12 and 13 and is designed in analogy to the connecting profile 40. Like the other connecting profiles 20, 30 and 40, this profile 50 is subdivided lengthwise into individual profile sections 51 which have the cross-sectional design of a U-shaped profile whose opposing legs 52 (only one is shown here) can be connected at their facing ends with a tongue-and-groove connection. For this purpose, one of the legs 52 is provided with a pinlike projection 53 which acts as the tongue, while the other leg 52 has a recess 54 which acts as the groove and into which the projection 53 can be inserted, so supporting the facing ends of the profile sections 51 with respect to one another at their joint site St. In addition, at their joint site St, the profile sections 51 are provided with a base 55 which connects the two legs 52 to one another and in terms of the thickness of its material is of sheet-like design. For the purpose of support, the base 55 bears on a support element 56 whose cross-sectional design is like that of a U-shaped profile and whose thickness of material is the same as that of the legs 52. The legs 57 (only one of these is shown) of the support element 56 are disposed in the direction of the legs 52 and are mounted on the surface layers 12 and 13 by means of two weld spots SP arranged at a distance from one another, and its base 58, connecting the legs 57, forms the actual carrier for the profile sections 51. Opposite the base 58, between the legs 52, there is a cover element 59 which covers the joint site St between the profile sections 51. The cover element 59 is designed as a U-shaped profile and has a base 60 which covers the free ends of the base 55 while its legs 61 bridge the free ends of the legs 52. For fixing the cover element 59 there are two weld seams S11, arranged in parallel at a distance from one another and produced, for example, by beam or jet welding, which extend along the base 60 and the legs 61. In the region of the projection 53 the weld seams S11 are crossed by a weld seam S12, whose length is essentially the same as that of the projection 53 on the legs 52. The latter are connected in vacuum-tight fashion to the surface layers 12 and 13 by means of a weld seam S13. The weld seam 13 is provided in the vicinity of the base 55, extends along the legs 52 of the profile sections 51, and intersects with the weld seams S11 (see FIG. 9). By virtue of the arrangement of the weld seams S11 to S13, their points of intersection with one another and their individual course, the free ends of the profile section 51 are connected both in vacuum-tight fashion to surface layers 12 and 13 and to one another. At the same time minimal thermal conduction between the surface layers 12 and 13 is achieved.

The constructional design of the connecting profiles and their individual profile sections with their support by the supporting elements at the joint sites between the profile sections can also be employed, at least in a similar manner, to connect the surface layers 16 and 17 of the door 15.

The present invention can also be employed for the construction of a stove muffle which surrounds the oven space of a domestic stove. In this case it is necessary to design the thermal insulation materials provided between the surface layers, for their support, in accordance with the prevailing temperatures.

Instead of the cover elements which are employed to thicken the ends of the profile sections at the site of join it is also possible to achieve an increase in the thickness of the respective end of the profile section by means of a reinforcing piece assigned separately to each end of a profile section.

We claim:

1. A heat insulation wall, comprising:
   two mutually spaced apart outer surface layers having a contour, and being at least substantially vacuum-tight;
   a substantially U-shaped connecting profile extending along said contour, connecting said two outer surface layers in a vacuum-tight fashion, and enclosing, together with said two outer surface layers, an evacuable space, said connecting profile having profile sections and a sheet-shaped base, each of said profile sections having a joining site;
   a thermal insulation material filled in said evacuable space; and
   a support element fastened to said outer surface layers and supporting said profile sections at said joining site, said profile sections, said support element, and said base forming a vacuum-tight connection, said base bearing against said support element.

2. A domestic stove, comprising a heat insulating stove muffle surrounding an oven space, said stove muffle including a heat insulation wall in accordance with claim 1.

3. A refrigeration device, comprising a heat insulation housing and a heat insulation door, said housing and said door including a heat insulation wall in accordance with claim 1.

4. The heat insulation wall according to claim 1, wherein said profile sections have facing ends, said support element has a U-shaped profile and has a base supporting said facing ends of said profile sections.

5. The heat insulation wall according to claim 1, wherein said support element has a U-shaped profile, a base, and end faces fastened to said outer surface layers.

6. The heat insulation wall according to claims 5, wherein said support element has legs and tabs provided at said end faces adjacent to said legs, said tabs project in a direction from said base to said legs and are fastened to said outer surface layers.

7. The heat insulation wall according to claim 1, wherein said support element is cup-shaped and has at least two cup walls, said cup walls are at least approximately parallel and opposite to one another and fastened to said outer surface layers.

8. The heat insulation wall according to claim 1, comprising a cover element covering said profile sections at said joining sites in a region of said support element, said cover element being connected to said support element in a vacuum-tight fashion.

9. The heat insulation wall according to claim 1, comprising a cover element covering one of said profile sections at an end thereof, said end forming a joining site in a region of said support element, said cover element being connected to said support element in a vacuum-tight fashion.

10. The heat insulation wall according to claim 1, comprising a cover element having a flat profile, covering at least substantially a joining site in a region of said base of said connecting profile, and being connected in a vacuum-tight fashion to said support element at free ends of said profile sections.

11. The heat insulation wall according to claim 9, wherein said cover element has a U-shaped profile, a base, and legs and is connected in vacuum-tight fashion to said profile sections and said support element, said base together with said legs cover at least substantially a site of join between said profile sections.

12. The heat insulation wall according to claims 1, wherein said profile sections have legs and a tongue-and-groove connection for joining said profile sections at least at said legs.

* * * * *